United States Patent [19]
Yale

[11] Patent Number: 5,873,581
[45] Date of Patent: Feb. 23, 1999

[54] TRUCK STEERING STABILIZER

[76] Inventor: Donald M. Yale, 806 E. Lake Dr., Gladewater, Tex. 75647

[21] Appl. No.: 675,113

[22] Filed: Jul. 3, 1996

Related U.S. Application Data

[63] Continuation-in-part of Ser. No. 164,806, Dec. 10, 1993, abandoned, which is a continuation-in-part of Ser. No. 930,997, Aug. 17, 1992, Pat. No. 5,271,638.

[51] Int. Cl.[6] ................................................. B60G 11/46
[52] U.S. Cl. .................................. 280/5.519; 280/5.515; 280/61.57; 280/124.163
[58] Field of Search ...................... 280/712, 711, 280/718, 714, 5.5, 5.514, 5.515, 6.157, 124.162, 124.163; 188/299, 299.1

[56] References Cited

U.S. PATENT DOCUMENTS

| | | | |
|---|---|---|---|
| 2,881,799 | 4/1959 | Menewisch | 280/712 |
| 3,050,316 | 8/1962 | Behles | 280/712 |
| 3,063,732 | 11/1962 | Harbers et al. | 280/712 |
| 3,285,281 | 11/1966 | Pribonic et al. | 280/712 |
| 4,919,399 | 4/1990 | Selzer et al. | 280/712 |
| 5,271,638 | 12/1993 | Yale | 280/712 |

*Primary Examiner*—Eric D. Culbreth
*Attorney, Agent, or Firm*—Robert Nisbett

[57] ABSTRACT

By this invention is provided an apparatus and method of improving the ride and handling characteristics of the tractor unit of a tractor trailer rig which is used to haul loads over highways. The apparatus provides an air bellows located above the springs behind the axle of the wheels and in front of the rear shackle of the springs and is designed to apply an adjustable, governed force above the springs in the plane defined by the center line of the tractor frame and the longitudinal axis of the spring.

17 Claims, 4 Drawing Sheets

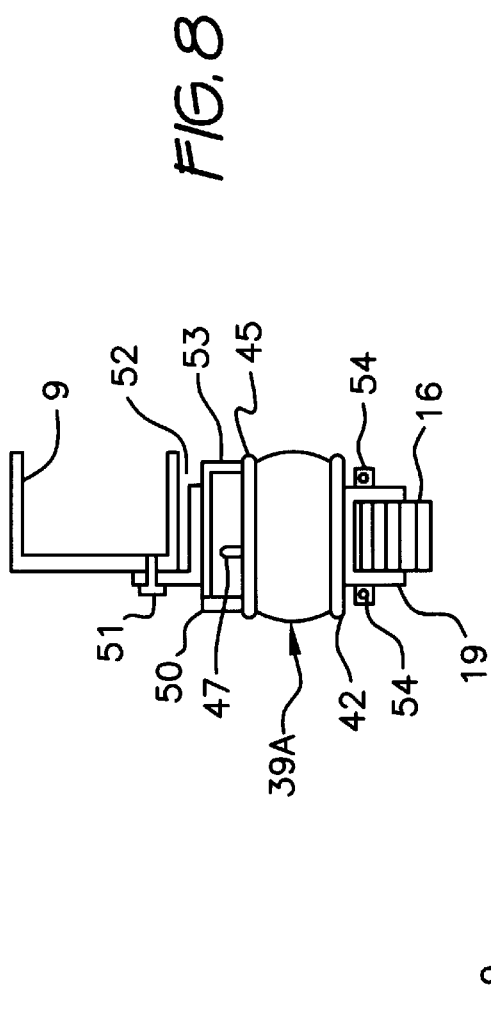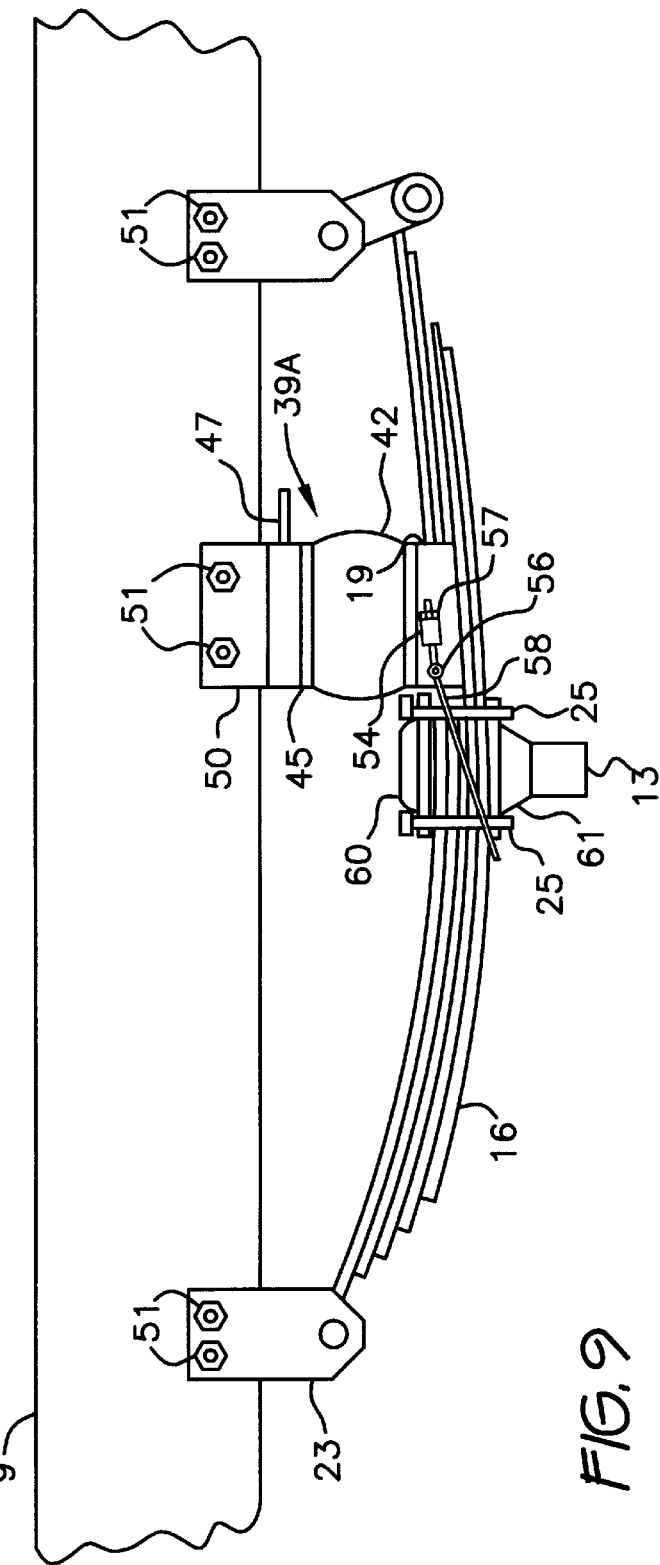

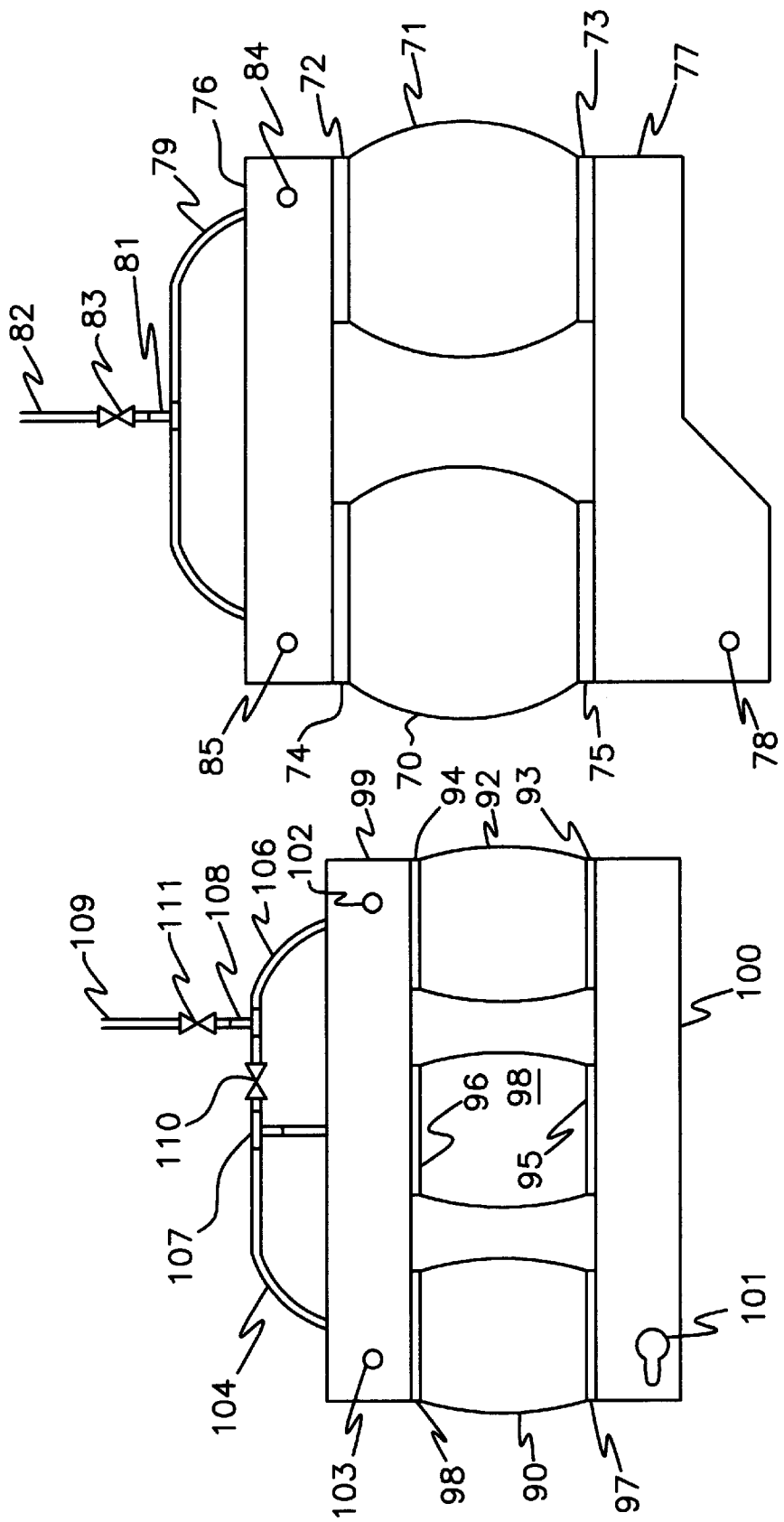

TRUCK STEERING STABILIZER

RELATED APPLICATIONS

This application is a continuation-in-part of U.S. application Ser. No. 08/164,806, filed Dec. 10, 1993, abandoned, which is a continuation-in-part of U.S. application Ser. No. 07/930,997, filed Aug. 17, 1992 now issued as U.S. Pat. No. 5,271,638.

BACKGROUND OF THE INVENTION

The invention of this application relates to the use of an adjusting device which operates through a connection to the leaf spring of the front steering wheels and the frame of a tractor unit to provide optimum ride, handling and steering characteristics for a truck.

PRIOR ART

Numerous Patents show variations in various attempts to provide more versatile suspension systems for vehicles used on roadways and some of those illustrate the use of air inflated type springs or boosters. Such typical patents are listed as follows:

| Pat. No. | Inventor | Issue Date |
| --- | --- | --- |
| 1,470,424 | T. W. E. Brogden | Oct. 9, 1923 |
| 1,714,067 | W. N. Angelus | May 21, 1929 |
| 1,858,783 | A. F. Masury | May 17, 1932 |
| 1,880,703 | T. C. Bischoff et al | Oct. 4, 1932 |
| 1,920,206 | A. F. Masury | Aug. 1, 1933 |
| 1,957,072 | A. F. Masury | May 1, 1934 |
| 2,109,074 | R. W. Wilsson | Feb. 22, 1938 |
| 2,141,781 | LeRoy V. Adler | Dec. 27, 1938 |
| 2,150,622 | N. E. Hendrickson | Mar. 14, 1939 |
| 2,190,311 | M. E. Dayton | Feb. 22, 1938 |
| 2,227,762 | A. Ronning | Jan. 7, 1941 |
| 2,317,057 | T. A. Higby | April 20, 1943 |
| 2,236,734 | A. Ronning | April 1, 1941 |
| 2,566,393 | O. J Wolfe | Sept. 4, 1951 |
| 2,874,956 | D. J. La Belle | Feb. 24, 1959 |
| 2,989,300 | P. Johannsen | June 20, 1961 |
| 3,053,548 | J. C. Moore | Sept. 11, 1962 |
| 3,179,439 | R. N Janeway | April 20, 1965 |
| 3,399,795 | R. V. Clacker et al | Sept. 3, 1968 |
| 3,462,033 | R. J. Rioch | Aug. 19, 1969 |
| 3,489,427 | S. A. Vearnals et al | Jan. 3, 1970 |
| 3,595,408 | Ira C. Eddy | July 27, 1971 |
| 3,703,244 | D. P. Walsh et al | Nov. 21, 1972 |
| 3,722,948 | D. P. Walsh | Mar. 27, 1973 |
| 3,724,695 | R. S. Taylor | April 3, 1973 |
| 3,730,548 | E. B. Thaxton | May 1, 1973 |
| 3,730,550 | E. B. Thaxton | May 1, 1973 |
| 3,866,894 | P. J. Sweet et al | Feb. 18, 1975 |
| 4,033,607 | J. S. Cameron | July 5, 1977 |
| 4,033,608 | P. J. Sweet et al | July 5, 1977 |
| 4,397,478 | J. R. Jensen et al | Aug. 9, 1983 |
| 4,619,467 | J. W. Lafferty | Oct. 28, 1986 |
| 4,789,369 | W. H. Geno et al | Jan. 17, 1989 |
| 4,919,399 | R. J. Selzer et al | April 24, 1990 |

The above references were found using the invention described herein as a reference point; the references describe features that might be used with this invention by one skilled in the art using this disclosure; the references are incorporated herein by reference for all purposes.

BRIEF DESCRIPTION OF THE DRAWINGS

FIG. 8 is a front view of another air bellows mounting assembly.

FIG. 9 is a side view of another air bellows mounting assembly.

FIG. 10 is a side view of one embodiment of a multi-bellows air bellows spring assembly showing two air bellows mounted in-line and in a spaced apart arrangement.

FIG. 11 is a side view of one embodiment of a multi-bellows air bellows spring assembly show one arrangement for three bellows.

SUMMARY OF THE INVENTION

Figure 1:
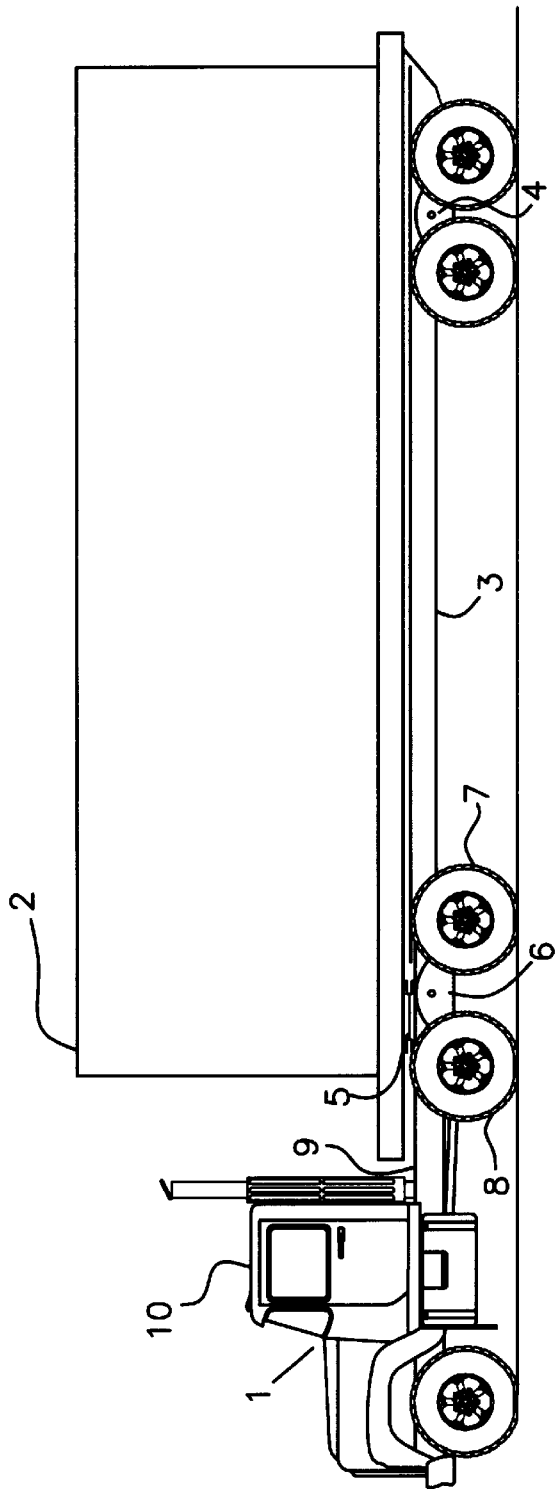
FIG. 1 is a side view or elevation of a tractor trailer motor vehicle showing location of the front steering wheels, the driving wheels, the fifth wheel and the trailer components.

According to this invention, there is provided an improvement in the ride, handling and steering characteristics of the tractor portion of a truck. In one preferred embodiment the device is used with a truck known as an 18-wheeler as shown in FIG. 1. The device can be used with other types of trucks or tractors such as shown in FIG. 1 which pull some type of trailer, 2, wherein the trailer connects to the tractor above the rear wheels 7 and 8 so that the tractor frame, 9, bears a portion of the load of the trailer 2, through pivot point connecting device 5. As shown, in the figure the pivot point connecting device 5, is known as a fifth wheel. This type of connector allows the tractor and trailer to pivot and turn in relation to each other, yet transfers the force from the motor powered tractor through the fifth wheel to pull or push the trailer. Typically, the fifth wheel is moveable or adjustable along the frame 9 from a point immediately above the rear drive wheels 7 and 8 to a point forward toward the cab of the truck 10. Moving the fifth wheel forward transfers more of the load of the trailer on the fifth wheel to the front steering wheels 11 and 12. The total amount of load in the trailer 2 affects the ride and handling characteristics of the truck and trailer and especially of the tractor itself. The proportion of the total load on the fifth wheel which is carried by the front steering wheels 11 and 12 also affects the ride and handling characteristics of the vehicle.

Typically, the total load of the vehicle and the load on the fifth wheel is determined by the payload in the trailer over which the driver or operator has little control. The load is determined by each job and the load frequently changes over a long haul due to portions of the load being delivered at its destination and additional cargo being loaded at intermediate terminals.

The load distribution from the fifth wheel can be varied by moving the fifth wheel 5 forward to increase the proportion of the load on the front steering wheels 11 and 12 or by moving the fifth wheel rearward to increase the proportion of the load from the fifth wheel 5 on the rear driving wheels 7 and 8. As shown in FIG. 1, the driving wheels 7 and 8 are the left wheels. There are corresponding wheels on the right side of the tractor which cannot be seen in the drawing, and these wheels are typically dual or double wheels so that there are typically eight (8) tires or wheels in an arrangement as shown in FIG. 1. Likewise, the wheels at the rear of the trailer 4 have a similar arrangement except they are not driven by a motor. These wheels can also be mounted in tandem or each axle can be mounted or sprung individually. If they are mounted in tandem the axles for wheels shown at 7 and 8 are mounted on a pivoting member 6 which allow the axles to pivot up and down to assist in maintaining all of the wheels on both axles in contact with the ground or pavement.

With the total load on the fifth wheel, 5, varying as the load in the trailer varies, the driving characteristics of the tractor and especially the front steering wheels varies. The quality of the roadway including condition of the pavement, slope, grade, curvature and texture also causes the tractor to be more difficult to steer or control for certain conditions. The front end alignment and ease or difficulty in steering of the tractor will also vary according to the load on the front steering wheels, as will the reaction mechanics of the front leaf spring and axle in combination and the reference position of the front leaf spring. By reference position is meant the usual position of the springs in relation to the tractor frame when the springs are not moving in response to a rise or dip in the road or in response to acceleration or braking.

This invention can be used with types of trucks other than an 18-wheeler as long as the tractor or pulling portion of the vehicle carries or bears a portion of the load of the front of the trailer. Goose-neck trailers and four wheel truck vehicles are an example. Typically goose-neck trailers are connected to a truck using a ball joint as the pivot point and pulling connection; however, a fifth wheel connection can be used on them also.

Generally this invention provides in a motor vehicle having a tractor portion containing an engine for moving said vehicle and a trailer portion for containing a substantial portion of the vehicle load wherein the said trailer connects to the tractor portion near a set of rear wheels, above said rear wheels and between said rear wheels and a set of front steering wheels by an adjustable pivot point so that a major portion of the connecting load of the said trailer rests on said rear wheels and the portion of said load on said rear wheels can be adjusted by moving said pivot point forward and rearward between said rear wheels and said front wheels, wherein the front steering wheels are attached to the frame of said tractor by a set of leaf springs attached to the frame and an axle bearing said steering wheels, the improvement comprising mounting an adjustable air bellows assembly or means directly above the front leaf spring and directly below the frame of said tractor wherein the air bellows is mounted at a point directly above the longitudinal center line of said leaf spring and at a point above said leaf spring between the point of attachment of the axle for said steering wheels and said leaf spring and the rear shackle of said leaf spring, wherein said air bellows is connected to the frame of said tractor directly above the air bellows, and wherein the air pressure can be manually adjusted by the tractor driver so that the air bellows exerts the desired force between the tractor frame and the front leaf spring which desired force can be adjusted by the driver according to the load distribution between the front wheels and rear wheels of said tractor and the road conditions for optimum driving conditions of said tractor.

DESCRIPTION OF PREFERRED EMBODIMENTS

Figure 5:
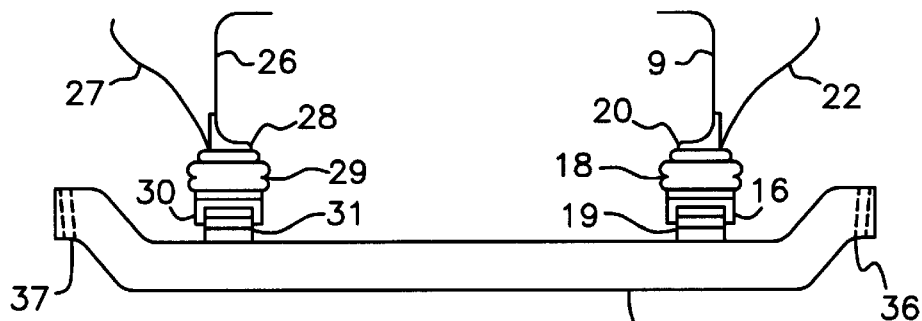
FIG. 5 is a diagram of the front view of the frame and axle arrangement of FIG. 4.
Figure 6:
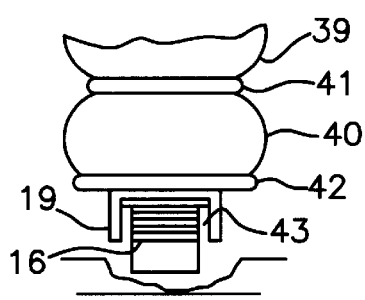
FIG. 6 is a front view of the lower mounting details of an air spring assembly.

The drive stabilizing device of this invention can have several variations as described herein and the preferred features for any given application will depend upon the particular type and design of the tractor on which it is to be used. The total force to be applied by the air spring bellows and the particular mounting position on the leaf spring will determine the size of the air spring bellows required. The range of air pressure to be used with the air spring bellows will also determine the size of the air spring bellows required. The greater the force required from the air spring bellows the greater the effective diameter of the air spring bellows required. The effective diameter is the nominal diameter of the bellows or the diameter of a circle over which the air pressure in the bellows would be applied to produce the force of a particular air bellows. The maximum outside diameter of the air bellows will be larger than the effective or nominal diameter because of the manner and material of construction of the air bellows. The air bellows 39 and 40 as shown in FIGS. 5 and 6 is preferably constructed of an elastomeric or rubber like material which will easily flex and deform as the leaf spring 16 moves relative to the frame 9 and it will also flex with the change in air pressure inside the air bellows. The internal air pressure will tend to expand the elastomeric material of the air bellows to some degree. With a higher range of air pressure which can be used inside the air bellows a smaller effective diameter of the air bellows can be used to produce the same force on the leaf spring and frame by the air bellows. Another consideration in selecting the preferred features for the air bellows spring is the clearance between the leaf spring and the truck frame. For a small clearance, a larger effective diameter air bellows would be required to produce a given range of force between the leaf spring and truck frame for a given range of air pressure applied inside the air spring bellows. For a limited clearance, a more restricted or smaller range of air pressure may be necessary to prevent over extension of the leaf spring to provide effective application of a minimum force by the air spring bellows. As shown in FIG. 1 one preferred application or embodiment of this invention is used on a motor vehicle known as an 18-wheeler truck. The motor vehicle has a tractor 1, attached to a trailer 2 by a pivotal connection known as a fifth wheel 5. The fifth wheel 5 is mounted on the frame 9 of the tractor and typically can be adjusted forward from the driven wheels 7 and 8 which can be independently mounted and supported by springs attached to the frame 9 or the driven wheels 7 and 8 can be mounted in tandem on a support which pivots about a central axis at 6. If mounted in tandem the structure and axis at 6 would carry all of the load applied to wheels 7 and 8 by the truck frame 9. The trailer 2 as shown has an enclosed body which is supported by frame 3 which is attached to the rear trailer wheels at 4 through a tandem or pivotable arrangement. An 18 wheeler has dual wheels on each side at each wheel location shown at 7, 8 and 4. For an enclosed trailer such as shown the cargo can be loaded at various locations and unloaded at various locations so that the total load and the weight distribution within the trailer can change at each terminal along a given route which in turn changes the load on the front to the trailer at the fifth wheel 5 and consequently on the driven wheels 7 and 8 and the steering wheels 11. Distribution of the load between the driven wheels 7 and 8 and the steering wheels 11 can be adjusted to a limited degree by moving the fifth wheel 5 forward toward the steering wheels or rearward toward the driven wheels 7 and 8. Moving the fifth wheel 5 forward increases the proportion of the load on the fifth wheel while moving the fifth wheel 5 rearward toward the driven wheels 7 and 8 increases the proportion of the fifth wheel 5 load on the driven wheels. The distribution of this load and the total load on the steering wheels 11 affect the alignment of the front wheels and the driving characteristics of the steering wheels and the tractor 1. While it is not practical to control the total load on the steering wheels or the exact distribution of fifth wheel load between each stop on a truck route, the adjustment device of this invention provides an apparatus and method for improving the ride, handling driving and steering characteristics of such a tractor regardless of the amount of variation in load on the steering wheels. The device also improves driving characteristics due to variations in road conditions. The invention improves the ride and handling characteristics of the vehicle due to the force of the air spring stabilizers applied to the steering axle in a particular manner through the leaf spring without restricting action of the leaf spring and without creating undesireable torques forces on the spring or axle. Location and adjustability of the force applied by the air bellows spring is critical to best performance of the invention and for maximum improvement in handling characteristics.

Figure 3:
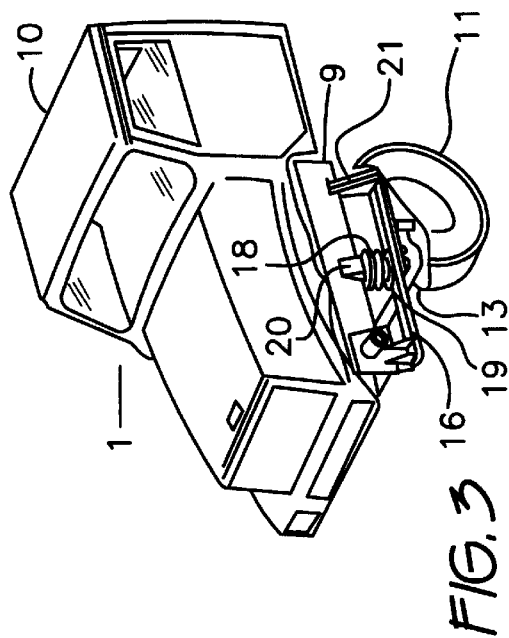
FIG. 3 is a cutaway view of the left front quarter of a tractor showing the location of the left front wheel the axle, the leaf spring, mounting brackets and air bellows mounting.
Figure 2:
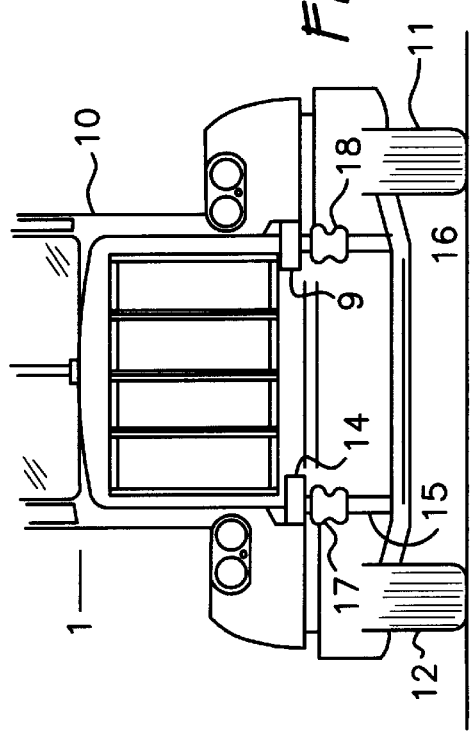
FIG. 2 is a front cutaway view of a tractor showing the location of the front steering wheels, axle, frame, leaf springs and air bellows.
Figure 4:
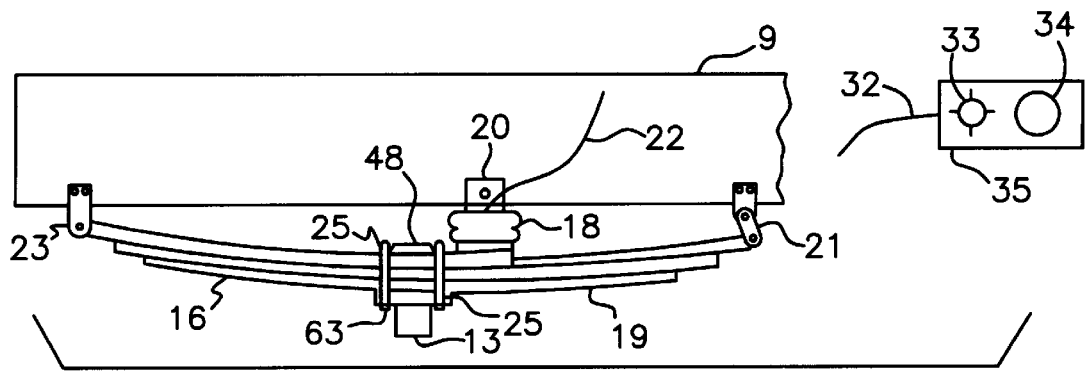
FIG. 4 is a side view of a typical truck frame with leaf spring showing location and connection of the air bellows and air supply means.

The relative location of the air spring bellows 17 and 18 are shown in FIGS. 2 and 3. The bellows 17 and 18 are located over the top of leaf springs 15 and 16 respectively and are attached in a vertical line as shown in FIG. 2 to the tractor frames 9 and 14 immediately above the air spring bellows. This mounting over the center line on the longitudinal axis of the leaf springs 15 and 16 prevents the stabilizing air bellows springs from creating any torque about the longitudinal axis of the leaf springs. Mounting the air spring at any position than over the center line of the leaf spring 15 and 16 creates torque or rotational forces which create problems with the springs, axle mounts and control of the steering mechanism. The air bellows spring of this invention 18 is mounted on the leaf spring in a space beginning immediately to the rear of the steering axle 13 and going approximately one-half (½) of the distance between a vertical center line through axle 13 and the rear spring shackle 21. A preferred range for this space would be from the vertical center line of the axle 13 through one-fourth (¼) of the distance along the leaf spring 16 toward the rear spring shackle 21. A more preferred mounting position for the air spring bellows is adjacent to the steering axle mounting brackets 48 and 60 as shown in FIGS. 4 and 9. In this position the air bellows spring exerts maximum restraining and dampening force to movement of the leaf spring 24 and 16 respectively and maximum benefit is obtained from both the leaf spring 24 and 16 and the air spring bellows 18 and 29. In this position the air bellows 18 and 29 also counter act the torque and front-end dive applied to the axle 13 and leaf spring 24 and 16 when the brakes are applied to rotating front wheels 11 and 12 as shown in FIG. 1 and 2. Thus, the action of the forces applied by the air bellows springs in 18 and 29 as shown in FIGS. 4 and 5 tend to stabilize or maintain the handling and steering characteristics of the truck front steering axle and wheel a alignment system.

In addition to the other actions described herein the stabilizing system of this invention also tends to maintain the front wheel alignment during the vibration and load variations on the front steering axle. The alignments known as caster, toe-in and camber tend to change with changes in load on the steering axle, vibration or bounce of the front axle and with torque of braking when the brakes are applied on the front steering wheels. The air bellows spring system of this invention tend to counter act changes in the front wheel alignment as to the above settings.

Several preferred embodiments are described herein and various features of these embodiments are illustrated in the drawings. From this disclosure it will be obvious how these features can be used in different combinations and to produce other preferred embodiments.

FIGS. 2 and 3 shows a typical truck 1 or motor vehicle tractor having a cab 10 mounted on top of frame members 9 and 14. The frame members extend from the front of the truck bumper to the rear of the tractor and carry the cab, engine (not shown) and the trailer supporting means such as the fifth wheel 5 shown in FIG. 1. The frame members 9 and 14 are connected to and supported by the drive wheels 7 and 8 and the steering wheels 11 and 12. The wheels are connected to the frame 9 and 14 using some type of spring mechanism which dampens road vibrations and adjust for variations in height in the roadway. The spring mechanism shown in FIGS. 2 and 3 for the front steering wheels is a leaf spring type which as shown in FIGS. 3, 4, and 9 have a fixed pivotable mount or bracket 23 which allows the front of the leaf spring to rotate as the spring flexes allowing the axle 13 and wheels 1I1 and 12 to move up and down relative to the frame 9 and 14. The longitudinal axis of the leaf spring 16 runs horizontally from the front bracket 23 to the rear shackle 21. The front spring mount or bracket 23 is fixed or secured to the frame 9 by bolts 51. The rear spring shackle 21 is also pivotably attached to the leaf spring 16 at the rear of the spring and pivotably attached to a rear spring mount or bracket which is also fixed to the frame 9 by bolts 51. The pivotable connection at the rear of the leaf spring 16 allows adjustment for changes in length and position of the the rear end of the leaf spring as the leaf spring flexes and rotates about the front pivot mount due to variations in load applied to the front of the truck tractor 1 and due to variations caused by upward and downward movement of wheels 11 and 12 caused by the roadway.

As shown in FIGS. 4 and 9 the leaf spring 16 is attached to the axle 13 of the front steering wheels 11 and 12 by a bracket and clamp mechanism. The axle 13 runs traverse of the truck tractor 1 and the truck frame 9 and 14 and carries wheels 11 and 12 through one of several types of pivotable and adjustable steering mechanisms which are not shown but would attach at points 36 and 37 as shown in FIG. 5. A steering mechanism which is not shown would also attach to wheels 11 and 12 so that the position of these wheels could be controlled to control the path of the truck tractor.

The axle 13 is secured to the leaf springs 16, 24 and 31 using a top bracket 48 and 60 and a bottom bracket 61 secured together and around the brackets and leaf springs by U-bolts 25. These brackets and U-bolts make a rigid and fixed section of the leaf spring 16, 24, and 31 which allows the terminal ends of each leaf to flex and move relative to each other.

The embodiment of the air spring device of this invention as shown in FIGS. 4 and 5 has a double air bellows 18 which is attached to a top mounting plate or bracket 20 and can be attached to frame member 9 by one or more of several method since due to the design and location of the device the bracket does not carry a great deal of stress. The bracket 20 can be attached to the frame 9 by bolts, by threaded machine screws, by any conventional attachment method or a combination of methods.

The air springs shown in FIGS. 4 and 5 has a lower mounting bracket or saddle 19 and 30 which fits over the top of the leaf spring 16, 24 and 31 yet is moveable and allows the spring and each leaf to move freely and independently. The saddle bracket 19 serves to transmit force from the air bellows downward to the top of the leaf spring without creating additional stress in the leaf spring due to restraint upon movement of the spring, spring leaves or the saddle bracket. The saddle bracket is under practically only compressive forces and therefore requires little force or only very light restraining means to keep it in position on top of the leaf spring such as when a minimal force or minimal air pressure is applied inside the air spring. A simple clamp mechanism (not shown) or a simple cable assembly 54, 56, 57 and 58 in FIG. 9 can be used to retain the saddle bracket in position if desired.

The air bellows 18 and 29 are connected to an air supply means 35 shown as air lines 22, 27 and 32 by such as tubular means such as metal, rubber, plastic or a combination of these types of hoses or pipes. The air supply means uses a manual valve 33 and gauge 34 by which the operator or truck driver in the cab 10 can manually adjust the air pressure applied to the air bellows as frequently and in any manner desired. The air source (not shown) is typically a compressor and reservoir driven by the truck engine or an independent power plant. The air supply means 35 is typically located in the cab 10 close to and in a convenient position for the truck driver and receives air through a hose or pipe to the reservoir. The air supply means is designed so that valve 33 sets and maintains a constant pressure on the air bellows which pressure is shown by gauge 34. Air pressure up to about 100 pounds per square inch gauge (psig) can be used in the air bellows of this invention and the air volume requirements are very low.

Figure 7:
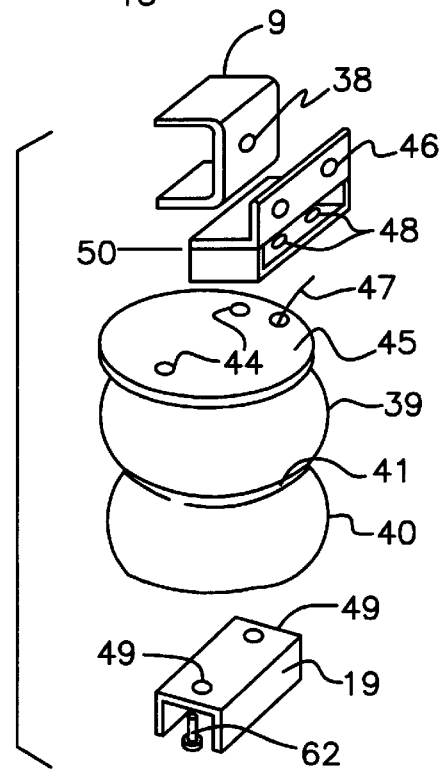
FIG. 7 is an exploded view of an air bellows assembly showing the top and bottom mounting brackets.

In FIGS. 4 and 5 air bellows 18 and 29 and mounting brackets 20 and 28 are shown which allow the air lines 22 and 27 to exit through a top plate of the air bellows assembly. This type of air bellows arrangement is also shown in FIG. 7 where the air line 47 passes through a top plate 45 at one side of the plate 45 so that it clears the side of the top mounting bracket 50. The top mounting bracket 50 has an open channel so that it can be removeably secured to the air bellows top plate 45 by using machine screws secured through bolt holes shown at 48 in FIG. 7. The top mounting bracket 50 can be secured to the frame 9 with matching screws or bolts through holes shown at 46 and at 38 in the frame. Likewise the lower mounting bracket or saddle 19 is removeably secured to the air bellows lower plate 42 using machine screws 62 through holes 49. The air bellows 39 and 40 shown in FIGS. 6 and 7 is a double type used where clearance between the leaf spring 16 and frame 9 is not unduly limited. The bellows shown has an optional band 41 which strengthens and reduces outward inflation of the air bellows. The degree of outward inflation and strength of the air bellows is determined by its design, the quality of the elastomeric material and fabric used to make the air bellows. The larger the diameter of the bellows the greater strength required. Typically the air bellows has an effective or nominal inside diameter or I.D. in the range of about three to ten inches and preferably in the range of about 4 to 8 inches. Normally failure of the air bellows or any component of the system is not a problem or concern because due to the design and location, the system fails in a safe configuration and the steering system and conditions can be quickly returned to the original truck conditions as if the stabilizing system had not been installed on the truck tractor. All that is necessary for the system to be returned to neutral or any effect removed is for the driver operator to reduce the air pressure applied to the air bellows through valve 33. Other types of air adjustable mechanisms such as air cylinders which are slideably adjustable concentric cylinders made of metal or some other fairly rigid material sealed at the edges either by slideable seals or an elastomeric skirt can also by used for some applications. For the preferred elastomeric type of air bellows spring the preferred operating range for the air pressure is 5–75 psig. For the metal or rigid side cylinder type air springs the operating range could be higher such as 10–100 psig.

In FIGS. 8 and 9 another type of air spring bellows 39A and upper mounting bracket 50 is shown. The air bellows is a single bellows type for more restricted clearance applications. The upper mounting bracket 50 is designed for an application where the air spring bellows 39A or the truck frame 9 would restrict clearance of the air inlet line 47. The top mounting bracket is designed with a channel 53 so that the air connection 47 passes upwardly through the base of the bracket which is attached to the top air bellows plate 45. The top bracket 50 has an angle mount 52 which conforms to and attaches to the frame 9 and is secured by some means such as a bolt or a machine screw at 51. The lower air bellows bracket or saddle 19 is attached to the lower or bottom air bellows plate 42. The saddle rests on top of the leaf spring 16. The saddle can be sized to fit over the leaf spring tightly as shown in FIG. 8 or it can be loosely fitted to the leaf spring as shown in FIG. 6. With either type of fit, a cushion material can optionally be used as shown at 43 in FIG. 6. In FIG. 9 the lower bracket or saddle 19 is loosely secured to the leaf spring by a cable clamp mechanism. A clamp housing or sleeve 54 is attached to the outer side of the saddle such as by welding. An eye bolt 56 with an adjusting nut 57 are secured through the sleeve 54. A cable or metal rod clamp or bracket 58 is secured to the eye bolts 56 on each side of the saddle and looped or passed around the axle brackets and U-bolts clamped to the leaf spring. The saddle is secured to the leaf spring 16 by tightening the nuts 57 on the eye bolts 56. In FIG. 9 the front spring mounts 23 and rear leaf spring mount 59 are secured to frame 9 spring bracket by bolts 51. The lower air spring bracket or saddle 19 can be sized in length to allow the air spring bellows 39A to be mounted adjacent and close to the axle bracket 60 as shown in FIG. 9. The saddle 19 can be of an extended length as shown in FIG. 4 so that the air spring bellows can still be secured to the axle bracket assembly 48 but the air spring is located more remotely from the axle bracket 60 so that the air bellows 18 applies force to the leaf spring 24 at a distance from the axle bracket. This distance is preferably in the range of up to one-half or more preferably ¼ of the distance from the bracket to the rear spring shackle.

In another embodiment of the air spring bellows apparatus or assembly or means of this invention two or more bellows are used instead of one single or double air bellows. As used herein reference to the bellows includes the elastic bladder mounted between the bottom or saddle bracket which includes the rubber or elastomeric sleeve that flexes or bends with movement of the top or bottom bracket relative to each other or which changes position with changes in internal air pressure as it is attached to a top plate and bottom plate. The top plate and bottom plate are the means by which the bladder or bellows is attached to the top mounting bracket and the bottom mounting bracket respectively. The air line connection for each bellows is usually attached to the bellows through either the top or bottom mounting plate but it can be attached through the side wall of the bellows. Any of these or any other conventional air line attachment methods can be used with the apparatus of this invention in view of this disclosure.

In this embodiment of the invention two or more bellows are mounted in-line along the top of the leaf spring which attaches to the steering axle and to the vehicle frame. The bellows are thus mounted along the top longitudinal center line of the leaf spring. Generally, the bellows for such a multi-bellows air spring assembly would be smaller in diameter and independently smaller in air capacity than an assembly using only one single or double bellows. The smaller diameter bellows typically used in a multi-bellows assembly can be sized and numbered to give a greater or smaller total force and/or air capacity between the frame and leaf spring; however, since there are two or more bellows the force is distributed differently to the top of the leaf spring. For a multi-bellows assembly the bellows preferably have a diameter in the range of about 3–6 inches and the length is selected to fit the particular vehicle. Larger diameter bellows can be used, for example 7–9 inches but are not generally needed and the smaller diameter bellows can be selected to provide adequate force and air capacity with greater clearance between the bellows and other parts of the vehicle near the frame and leaf spring. With the different distribution of the stabilizing force generally less total force can be applied to the leaf spring to produce the desired stabilizing effect. The air bellows preferably are sized to have an air capacity in the range of about 40–1000 cubic inches and more preferably in the range of about 40–800 cubic inches and independently in the range of about 40–500 cubic inches.

With the multi-bellows air spring apparatus of this embodiment the bellows are attached to a top bracket which is secured to the vehicle frame just as in other embodiments. The top bracket is designed to simply attach to the vehicle frame by conventional methods such as bolting or welding. For some applications the top bracket can be a simple L-shaped member with places to attach the top plate of each bellows and with a place to attach the top bracket to the frame. Some applications may require a channel in the top bracket for clearance or to allow the air lines to pass free of restriction by the frame. The relative width, location of the frame and clearance between the frame and leaf spring and other adjacent parts of the vehicle will determine the shape and size of the top bracket.

As with the other bellows air bellows assemblies of this invention, the multi-bellows assembly uses a lower bracket to secure the several bellows together at the bottom and to transfer the force from the bellows assembly between the bellows assembly and the leaf spring. With certain types of brackets and bellows assemblies this force can be in either or both downward and/or upward directions. The bracket or lower mounting plate is designed to rest on top of the leaf spring at the desired location yet allow the leaf spring to flex freely except for the additional force applied by the air bellows assembly to the leaf spring just rearward of the axle. The lower mounting plate has some type of restriction such as a flange, tab, u-bolt, extension or other means for restricting lateral movement of the lower mounting bracket which can extend some distance down the side of the leaf spring so that the saddle bracket can not move very far laterally with respect to the leaf spring. Friction between the spring and air bellows mounting plate can be used to restrict this lateral movement. When friction is used to restrict the plate movement, restriction means will not be apparent. One type of restriction can be a flange on the lower mounting bracket which can extend down on one or each side of the leaf spring. The extension or flange can extend along the spring just far enough to restrict the lower mounting plate or it can extend the entire length of the saddle bracket. The downward force applied by the assembly is always directed to the top portion of the leaf spring so that it does not create a torque or rotation force on the leaf spring about its longitudinal axis or about the axis going through the front spring mount and the rear spring mount or shackle. The lower mounting plate can fit on the leaf spring firmly or it can have a padding or sealing material between the saddle bracket and leaf spring to restrict movement of the saddle bracket relative to the leaf spring but it is mounted so that the leaf spring can move freely and the individual leaves of the leaf spring can move independently with respect to each other as the leaf spring flexes. In other words, the saddle bracket is not clamped to the leaf spring so that a clamping action restricts movement of each leaf relative to the other leaves. Such a clamping action is detrimental to both the leaf spring due to changes in the spring action of the leaf spring and also because the clamping action concentrates bending forces within the leaf spring at the edges of the clamped area. These restrictions prevent the leaf spring from working properly and can cause failure of the leaf spring where the forces are concentrated.

With the multi-bellows air bellows spring assembly of this embodiment, as well as with the one bellows single or double air bellows spring assemblies, a further improvement is the use of an orifice or restriction in the air supply line to produce a governing effect with the air bellows assembly. The governing orifice produces a time delay in any rapid changes of air volume in the air spring bellows. This delay in a change of volume can be merely a matter of a fraction of a second or it can be longer depending upon the size and design of the governing orifice or orifices used. The governing apparatus of this invention provides a means for controlling the rapid change of air volume in the air bellows. The orifice can be placed at one or several locations along the air supply line will not appreciably delay any adjustment of the set air pressure by the vehicle driver because the set pressure is adjusted slowly and gradually. The main effect of the orifice in the air bellows air line is to reduce the amount of air which can rapidly flow in or out of the air bellows when the bellows is suddenly compressed as by a sharp blow to the wheels, axle and leaf springs caused by a large bump or obstruction in the roadway. The orifice also reduces the amount of air that would flow into the air bellows from the air supply line when the wheels encounter a sudden drop in the roadway which could result from a large hole or dip in the road. In other words, the orifice has a dampening or governing effect on changes in the air volume in the air bellows and the action of the goverened air bellows assembly in conjunction with the vehicle support structure will produce a much smoother ride and it can reduce the amount of shock and vibration to the vehicle steering assembly due to such obstacles, holes or rough roadway. The governing device of this invention provides a quick or rapid response dampening action to improve the handling and ride characteristics of the vehicle.

For the governed response embodiment of the air bellows assemblies, the governing orifice can have a fixed or variable restriction. One type of restriction is a simple cylindrical plug with one or more small diameter openings or orifices which can be inserted in the air supply line at any of one of several places between the air supply regulator and the air bellows. The governing orifice can be placed in the air supply line itself either close to the air bellows or close to the air supply unit or pressure regulator. In some cases the governing orifice can be in the pressure regulator itself but this makes the pressure regulator more complicated and expensive. Typically, the pressure regulator is designed to respond rapidly to changes in pressure in the bellows air supply line by either adding air to the line or dumping air from the line. The governing orifice can be placed practically any where along the air supply line to the air bellows. For faster response and easier access the governing orifice can be placed close to or in the air bellows itself With multiple bellows assemblies, the governing orifice can be placed in the air supply line near the air bellows so that the pressure change characteristics of each air bellows can be regulated independently of the others or in the air supply line near several air bellows so that the pressure change characteristics of several air bellows can be regulated in combination and independently of other air bellows positioned on the same wheel support assembly.

Also, one, two or several governing orifices can be used for an air bellows spring assembly with more than one air bellows. For multi-bellows air spring assemblies, the several bellows can be located adjacent each other or the air bellows can be located a spaced distance apart from each other. For air bellows spring assemblies having three or more bellows two bellows may be located adjacent each other and the other bellows may be located a spaced distance apart from the first bellows. With these configurations a governing orifice can be located in the air lines between single bellows units, between multi-bellows units and other bellows units, as well as in the air line supplying air to the entire air bellows spring assembly. In other words, two or more bellows and one or more governing orifices can be assembled in a fashion, in view of this disclosure, to tailor or configure the response of the air bellows assembly to produce the desired movement of the wheels, axle and leaf springs to various types of obstructions and road conditions and to produce the best stabilizing conditions and to reduce damage to the vehicle carriage assembly.

The governing orifice can be a simple diaphragm or annular restriction with a sized hole in the center. This type of governing orifice can be easily inserted in the air supply line. The governing orifice can also be a simple valve such as a needle valve, a plug valve, a sleeve valve or a modification or combination of one or several of these. The governing orifice can have a fixed orifice which is permanent or removable and replaceable with another type or size. The governing orifice can be one of the above described devices which can be manually adjustable to provide the desired pressure response characteristics. The governing orifice can also be a floating valve type with a moving portion such as a spring biased plug or sleeve which would open and close off the air supply line from one or both directions, either fully or partially, for the desired time. The governing orifice can be an automatically adjusting type which has a moveable valve sleeve, plug or mandrel which is operated by the sudden change in the difference in air pressure between the air bellows side of the air supply line and the air supply side of the air supply line. The various features of the above devices and other features can be combined to give the desired air pressure response characteristics for each or all of the air bellows as desired in view of these teachings. Several of the locations of the governing orifice are illustrated in the drawings and other locations will be obvious from this description. One of the simplest governing orifice embodiments is the simple plug having a small diameter hole to provide the governing action. The plug can be a simple washer or a cylinder that can be fitted into an air line connection or it may be added by putting a separate fitting into the air line. Such a plug, cylinder or washer could have an orifice with a diameter in the range of about 0.001 to about 0.200 inches for a typical air supply system which could have an air line with a diameter in the range of about 0.15 to about 0.500 inches. The plug is preferably located near the air bellows which is to be governed at a readily accessible position so the plug can be easily changed for a different size or type if desired. The governing orifice has the effect on the air bellows assembly of producing a fast acting or quick response stabilizer which substantially reduces the vibration and torque forces typically produced on the support assembly and steering assembly of the vehicle. The air bellows assembly of this invention can also be used on supporting assemblies of vehicles other than the steering axle with advantageous results. When used on the weight bearing axles and spring assemblies, either in conjunction with leaf springs, coil springs, air springs or combinations, the governed air spring assemblies substantially reduce vibration and sway of the vehicle and fatigue of suspension parts due to excessive movement caused by rough roads. When the air bellows assembly of this invention is used with the weight bearing axles and coil or air spring supports the lower air bellows mounting plate should support the governed air spring assembly of this invention so that the governed air bellows is located behind axle or wheel being dampened by the governed air spring assembly. This location give better dampening during braking of the vehicle as well as at other times. The lower air bellows mounting plate may have to be modified to give the desired support and torque behind the weight bearing axle.

Several various configurations and features are shown in FIGS. 10 and 11 which illustrate the features discussed herein. FIG. 10 shows two bladders or bellows 70 and 71 mounted on lower or saddle bracket 77 and attached to upper bracket 76 by lower bellows plates 72 and 74. The bellows and plates are attached by conventional means including one of the several methods discussed herein. The saddle bracket 77 is shown with an extended area and the lower left end with a tension attachment means 78. This attachment means is the place where the saddle bracket is held against the axle bracket and leaf spring. In this embodiment the means shown is a bolt hole located below the leaf spring so that a bolt can be placed through the saddle bracket at this point to prevent the saddle bracket from moving upward. This attachment means would allow saddle bracket limited movement on the leaf spring but would not allow the saddle bracket to move upward on the leaf spring. This attachment means would prevent the saddle bracket from vibrating or from coming loose on the leaf spring. The top bracket has two bolt holes 84 and 85 for attaching the top bracket to the vehicle frame 9. Other attachment means can be used. From the top of the top bracket air line 79 comes from bellows 71 and air line 80 comes from bellows 70. Air lines 79 and 80 are joined together by tee 81 and to air supply line 82 by tee 81. As shown orifice 83 in air line 82 restricts the rate of change in air volume in the bellows 70 and 71 as well as in air lines 79 and 80. This in effect produces a time delay in changes in air volume in the bellows and the bellows act together as one unit in response to sudden shocks to the assembly caused by obstructions in the roadway. In FIG. 10 the two bellows are shown spaced apart from each other on the saddle bracket 77 which again produces a response which is different from an assembly which might have the air bellows closer together on the same size saddle bracket.

FIG. 11 shows an air bellows spring which has three bellows 90, 91 and 92 mounted on a saddle bracket 100 and attached to bracket 99. Bottom plates 93, 95 and 97 attach the bellows to saddle bracket 100. Top plates 94, 96 and 98 attach the bellows to top bracket 99. In the saddle bracket a keyway 101 type tension attachment means is shown. An adjustable bolt (not shown) or a spring (not shown) could be attached at point 101 to hold the saddle bracket 100 next to the axle bracket 61 and on top of the leaf spring. Top bracket 99 has holes 102 and 103 for attachment to the vehicle frame 9. From the top of top bracket 99 air line 104 comes from bellows 90, air line 105 comes from bellows 91, and air line 106 comes from bellows 92. Air lines 104, 105 and 106 are joined to each other and to air supply line 109 by tees 107 and 108. In the air lines orifices 110 and 111 are located to restrict air movement into and from bellows 90, 91 and 92. Orifices 110 restricts air flow to and from both bellows 90 and 91. Orifice 111 restricts air flow to all three bellows. Orifices 110 and 111 also work together to produce a different restriction effect between bellows 90 and 91 and between bellows 92. The position of the orifices and connecting tees can be varied to produce other response characteristics. Likewise, orifices 110 and 111 can be independently of fixed or variable restriction values to give even greater range of adjustment for the response characteristics of the multi-bellows units. A forth or fifth bellows could be added to the air bellows spring assembly for even greater control. Furthermore, the spacing of the various bellows can be varied for different effects. For example, the distance between bellows 90 and 91 could be increased or decreased so that two or more bellows act together while one or two bellows act more or less independently or together near one end of the saddle bracket. These variables can be used to position the different dampening forces along the leaf spring and to vary the response time characteristics of one or several of the bellows to produce the best stabilizing characteristics for each type of motor vehicle in view of this disclosure.

In view of this disclosure, other variations, preferred embodiments and applications of this invention will be obvious to one skilled in the art.

I claim:

1. In a motor vehicle used to haul loads over a highway, and wherein the vehicle has a tractor portion having a cab mounted on a frame and front steering wheels attached to said frame by a set of leaf springs with each leaf spring being mounted to said frame at the front by a front pivotable mount which allows the said leaf spring to rotate and thereby move up and down relative of said frame at said front mount, and wherein a longitudinal axis of the leaf spring runs horizontally from the front pivotable mount to the rear of said leaf spring where the rear of said leaf spring is pivotably attached to a rear spring mount which is pivotably attached to a rear mounting bracket which is attached to said frame and which allows for changes in position of a rear end of the leaf spring as it moves up and down relative to said frame, a means for adjusting the ride, handling, steering and vibration characteristics of said vehicle comprising:

(a) an air bellows spring assembly having at least one bellows mounted directly on and above the front leaf spring of said vehicle between said leaf spring and the frame of said vehicle in a space beginning immediately to the rear of a vertical line passing through the center of a steering axle and extending to the rear mounting bracket of said leaf spring;

(b) wherein said air bellows spring assembly is mounted on top of said leaf spring using a lower mounting plate which extends a predetermined distance along the top of said leaf spring in a manner allowing the leaf spring to flex freely;

(c) wherein the top of said air bellows spring assembly is secured to the frame of said vehicle by an upper mounting bracket near the top of said air bellows spring assembly so that the air bellows spring assembly exerts a force between the bottom of said frame and the top of said leaf spring;

(d) wherein said air bellows spring assembly is connected to an air supply means through connection tubing having a adjustable pressure adjustment means;

(e) wherein the spring action of said air bellows spring assembly can be adjusted using an adjustable pressure adjustment means, and (f) wherein said air spring bellows assembly has at least one bellows located over said leaf spring with said bellows having a restriction in the tubing.

2. A means for adjusting the handling and steering characteristics of claim 1 wherein the air spring bellows assembly comprises at least two bellows located over said leaf spring with the second bellows being a spaced distance apart from a first bellows on said lower mounting plate.

3. A means for adjusting the handling and steering characteristics of claim 1 wherein the air spring bellows assembly comprises at least two bellows located over said leaf spring with the second bellows being adjacent the first bellows on said lower mounting plate.

4. A means for adjusting the handling and steering characteristics of claim 1 wherein the air spring bellows assembly has a restriction in the air supply line comprising a removable orifice.

5. A means for adjusting the handling and steering characteristics of claim 1 wherein the air spring bellows assembly has a restriction in the air supply line comprising a variable orifice.

6. A means for adjusting the handling and steering characteristics of claim 1 wherein the said lower mounting plate is mounted in a space beginning immediately to the rear of the steering axle and going approximately one-half of the distance between the axle and the rear spring mount.

7. In a motor vehicle having a front steering axle movably supported by a set of leaf springs which movably connect said steering axle to a frame of said motor vehicle, a means for adjusting the handling and steering characteristics of said motor vehicle comprising:

(a) an air bellows spring assembly which is movably mounted directly on and above the said leaf spring between said leaf spring and said frame in a space defined by a vertical line through the center of said steering axle and a rear pivotable mounting bracket of said leaf spring;

(b) wherein said air spring means is movably mounted on the top of said leaf spring using a lower mounting plate which extends a predetermined distance along said leaf spring in a manner allowing the leaf spring to flex freely;

(c) wherein said air bellows spring assembly is secured to the said motor vehicle frame near the top of said air bellows spring assembly so that the air bellows spring assembly exerts a force between the bottom of said frame and the top of said leaf spring;

(d) wherein said air bellows spring assembly comprises at least one air bellows; and (e) wherein said air bellows spring assembly is connected to a pressurized air supply means through connecting tubing containing an adjustable pressure regulating means which can be adjusted.

8. A means for adjusting the handling and steering characteristics of a motor vehicle of claim 7 wherein the said connecting tubing has a restricting orifice which provides a time delay for changes in volume of air contained in said air spring bellows.

9. A means for adjusting the handling and steering characteristics of a motor vehicle of claim 7 wherein the air spring bellows assembly comprises at least two air bellows on said lower mounting plate.

10. A means for adjusting the handling and steering characteristics of a motor vehicle of claim 7 wherein the said lower mounting plate is mounted in a space beginning immediately to the rear of the steering axle and going approximately one-half of the distance between the axle and the rear spring mount.

11. A means for adjusting the handling and steering characteristics of a motor vehicle of claim 7 comprising an air spring bellows assembly having bellows with a total air capacity in the range of about 40–1000 cubic inches.

12. A means for adjusting the handling and steering characteristics of a motor vehicle of claim 7 comprising an air spring bellows assembly having at least two bellows located in-line over said leaf spring and with each bellows independently having an air capacity in the range of about 40–800 cubic inches.

13. A means for adjusting the handling and steering characteristics of a motor vehicle of claim 7 wherein said connecting tubing has a restricting orifice which provides a time delay for changes in volume of air contained in said air spring bellows.

14. A means for adjusting the handling and steering characteristics of a motor vehicle of claim 7 comprising an air spring bellows assembly having at least two bellows located in-line over said leaf spring and with each bellows having an air capacity independently selected from the range of about 40–800 cubic inches.

15. In a motor vehicle having a front steering axle movably supported by a set of leaf springs which movably connect said steering axle to a frame of said motor vehicle, a means for adjusting the handling and steering characteristics of said motor vehicle comprising:

(a) an air bellows spring assembly which is movably mounted over said leaf spring between said leaf spring and said frame;

(b) wherein said air bellows spring assembly is movably mounted on the top of said leaf spring;

(c) wherein said air bellows spring assembly is secured to the said motor vehicle frame near the top of said air bellows spring assembly so that the air bellows spring assembly exerts a force between the bottom of said frame and the top of said leaf spring;

(d) wherein said air bellows spring assembly comprises at least one air bellows;

(e) wherein said air bellows spring assembly is connected to a pressurized air supply means through connecting tubing containing an adjustable pressure regulating means which can be adjusted while the vehicle is in motion; and (f) wherein said connecting tubing has a restricting orifice which provides a time delay for rapid changes in volume of air contained in said air bellows.

16. A means for adjusting the handling and steering characteristics of claim 15 wherein a second bellows is mounted over said leaf spring is a spaced distance apart from a first bellows.

17. A means for adjusting the handling and steering characteristics of claim 15 wherein said air spring assembly is mounted on a bracket which is mounted in a space beginning immediately to the rear of the steering axle and going approximately one-half of the distance between the axle and a rear spring mount.

* * * * *